US012780013B2

(12) United States Patent
Gingerich et al.

(10) Patent No.: US 12,780,013 B2
(45) Date of Patent: Nov. 3, 2026

(54) SYSTEM AND METHOD FOR DETERMINING POSITION OF POWER RAIL OF ELECTRIC POWER SUPPLY SYSTEM

(71) Applicant: Caterpillar Inc., Peoria, IL (US)

(72) Inventors: David Gingerich, Dunlap, IL (US); Ruchi Bhatia, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 35 days.

(21) Appl. No.: 18/986,775

(22) Filed: Dec. 19, 2024

(65) Prior Publication Data

US 2026/0175705 A1 Jun. 25, 2026

(51) Int. Cl.

| | |
|---|---|
| ***B60L 50/53*** | (2019.01) |
| ***G01S 13/86*** | (2006.01) |
| ***G01S 13/87*** | (2006.01) |
| ***G01S 13/89*** | (2006.01) |
| ***G01S 17/86*** | (2020.01) |

(52) U.S. Cl.

CPC ............ *B60L 50/53* (2019.02); *G01S 13/865* (2013.01); *G01S 13/867* (2013.01); *G01S 13/87* (2013.01); *G01S 13/89* (2013.01); *G01S 17/86* (2020.01); *B60L 2200/44* (2013.01)

(58) Field of Classification Search

CPC ...... B60L 5/38; B60L 5/39; B60L 5/40; B60L 5/42; B60L 9/04; B60L 9/18

See application file for complete search history.

(56) References Cited

U.S. PATENT DOCUMENTS

| | | | | |
|---|---|---|---|---|
| 9,346,361 | B2 * | 5/2016 | Francke | B60L 5/08 |
| 9,403,526 | B2 | 8/2016 | Saito et al. | |
| 9,931,936 | B2 | 4/2018 | Bruce | |
| 10,108,201 | B2 | 10/2018 | Engdahl et al. | |
| 2007/0000744 | A1 | 1/2007 | Craig et al. | |

(Continued)

FOREIGN PATENT DOCUMENTS

| | | |
|---|---|---|
| WO | 2024056636 | 3/2024 |
| WO | 2024144440 | 7/2024 |

OTHER PUBLICATIONS

Written Opinion and International Search Report for Int'l. Patent Appln. No. PCT/US2025/055697, mailed Mar. 27, 2026 (11 pgs).

*Primary Examiner* — Kenneth J Malkowski

(74) *Attorney, Agent, or Firm* — Fitch, Even, Tabin & Flannery LLP

(57) ABSTRACT

A system for determining a position of a power rail of an electric power supply system at a worksite includes a work machine, a first sensor that generates a first input signal corresponding to a geographical position of the work machine, a second sensor that generates a second input signal indicative of a distance between the work machine and the power rail, and a controller including one or more processors. The one or more processors determine the geographical position of the work machine based on the first input signal received from the first sensor, determine the distance between the work machine and the power rail based on the second input signal received from the second sensor, and determine a position of the power rail at the worksite based on the geographical position of the work machine at the worksite and the distance between the work machine and the power rail.

20 Claims, 5 Drawing Sheets

(56) References Cited

U.S. PATENT DOCUMENTS

| | | | | |
|---|---|---|---|---|
| 2016/0090007 | A1* | 3/2016 | Buehs | B60L 5/36 191/33 R |
| 2016/0375796 | A1* | 12/2016 | Gruenjes | B60M 1/22 191/33 R |
| 2017/0219335 | A1 | 8/2017 | Shiraishi et al. | |
| 2023/0121854 | A1 | 4/2023 | Maruyama et al. | |
| 2023/0191915 | A1 | 6/2023 | Wulf et al. | |
| 2023/0202541 | A1 | 6/2023 | Moth et al. | |
| 2023/0368359 | A1* | 11/2023 | Braunstein | B60L 50/53 |

* cited by examiner

SYSTEM AND METHOD FOR DETERMINING POSITION OF POWER RAIL OF ELECTRIC POWER SUPPLY SYSTEM

TECHNICAL FIELD

The present disclosure relates to a system for determining a position of a power rail of an electric power supply system at a worksite and a method for determining the position of the power rail of the electric power supply system at the worksite.

BACKGROUND

Work machines, such as mining trucks, loaders, dozers, or other construction or mining equipment, are implemented with diesel-electric systems or battery systems to provide operating power to such work machines. In order to provide a power supply to the work machine, a worksite, such as a mining site, includes an electric power supply system. The electric power supply system includes a power rail that is supported on grounds using poles. The work machine may be connected to the power rail to provide the power supply to the work machine. A connector assembly is typically associated with the work machine to connect the work machines with the power rail.

A position of the power rail needs to be accurately determined to generate accurate site maps particularly for autonomous operations of the work machines. Currently, for determining the position of the power rail, a personnel has to walk along the power rail with a sensing device and take survey points at regular distances along the power rail, which involves considerable human effort. In some cases, the power rail may be 500 meters to a few kilometres long. A virtual model is then generated using a software based on the survey points. The virtual model needs to be validated by having a testing machine drive along the power rail and ensure that a position of a connector assembly of the testing machine lies within a predefined range. If the connector assembly is not within the predefined range, the entire process may have to be repeated. Thus, such a technique of determining the position of the power rail may be prone to errors, may be unreliable, may include multiple process steps, and may include usage of additional resources, such as the testing machine.

Alternatively, a number of surveying means, such as a light vehicle or a drone, may be used to survey the position of the power rail. However, such surveying means may increase a total cost of ownership at autonomous worksites.

U.S. Patent Application 2016/0375796 describes a transport system that includes a non-rail-bound, electric or hybrid-electric vehicle, an overhead contact line system along a lane for providing electrical energy, and a pantograph on the vehicle feeding electrical energy through a sliding contactor to line system contact wires. A detection device on the vehicle detects a position-dependent contact wire height and has a position determination system for a current detection position of the vehicle and a sensor system above a wheel level determining a contact wire height above a roadway at the detection position. A monitoring center has a storage device storing position-dependent target ranges for non-critical contact wire heights. A communication device transmits data between the monitoring center and the vehicle and contact wire heights detected on the vehicle with detection positions to the monitoring center. Critical contact wire heights within the line system can thus be quickly and centrally identified.

SUMMARY OF THE DISCLOSURE

In an aspect of the present disclosure, a system for determining a position of a power rail of an electric power supply system at a worksite is provided. The power rail extends alongside a route at the worksite. The system includes a work machine travelling on the route. The system also includes a first sensor disposed on the work machine. The first sensor is configured to generate a first input signal corresponding to a geographical position of the work machine at the worksite, as the work machine travels on the route. The system further includes a second sensor disposed on the work machine. The second sensor is configured to generate a second input signal indicative of a distance between the work machine and the power rail, as the work machine travels on the route. The system includes a controller including one or more memories and one or more processors communicably coupled with each of the one or more memories, the first sensor, and the second sensor. The one or more processors are configured to determine the geographical position of the work machine at the worksite based on the first input signal received from the first sensor. The one or more processors are also configured to determine the distance between the work machine and the power rail based on the second input signal received from the second sensor. The one or more processors are further configured to determine the position of the power rail at the worksite based on the geographical position of the work machine at the worksite and the distance between the work machine and the power rail.

In another aspect of the present disclosure, a method for determining a position of a power rail of an electric power supply system at a worksite is provided. The power rail extends alongside a route at the worksite. The method includes causing a work machine to travel on the route. The method also includes generating, by a first sensor disposed on the work machine, a first input signal corresponding to a geographical position of the work machine at the worksite, as the work machine travels on the route. The method further includes generating, by a second sensor disposed on the work machine, a second input signal indicative of a distance between the work machine and the power rail, as the work machine travels on the route. The method includes determining, by one or more processors of a controller, the geographical position of the work machine at the worksite based on the first input signal received from the first sensor. The one or more processors are communicably coupled with the first sensor. The method also includes determining, by the one or more processors, the distance between the work machine and the power rail based on the second input signal received from the second sensor. The one or more processors are communicably coupled with the second sensor. The method further includes determining, by the one or more processors, the position of the power rail at the worksite based on the geographical position of the work machine at the worksite and the distance between the work machine and the power rail.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
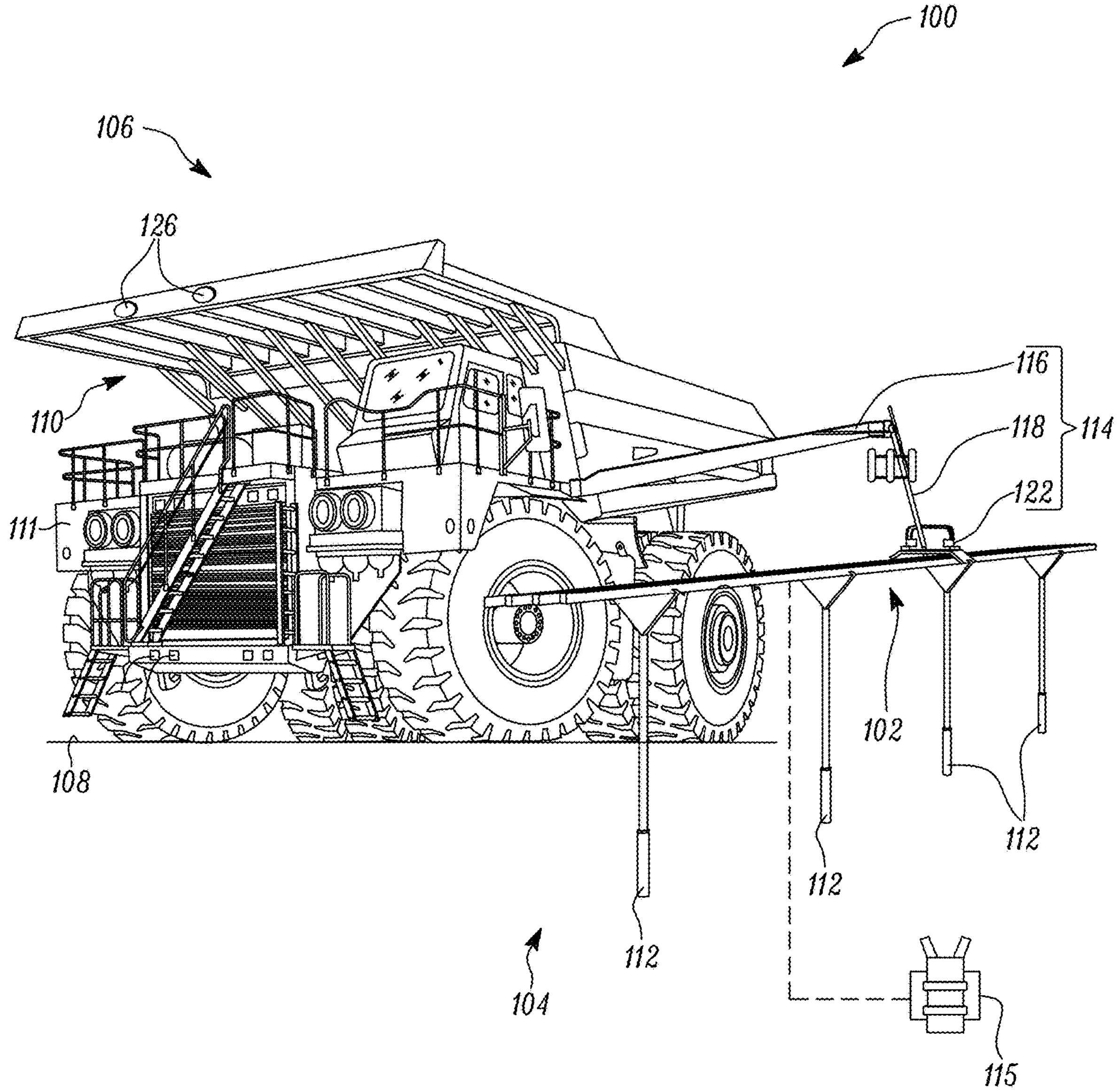
FIG. 1 is a schematic perspective view of a system for determining a position of a power rail of an electric power supply system at a worksite, according to an example of the present disclosure.

Referring to FIG. 1, a schematic perspective view of a system 100 for determining a position of a power rail 102 of an electric power supply system 104 at a worksite 106 is shown. The power rail 102 extends alongside a route 108 at the worksite 106. Various machines operating at the worksite 106 may receive the electric power supply from the electric power supply system 104. The power rail 102 is connectible with the machines operating at the worksite 106. The electric power supply system 104 may provide any suitable type and/or magnitude of the electric power supply to the machines. The power rail 102 may provide Direct Current (DC) power at any suitable voltage and current. The electric power supply system 104 includes a number of power modules 115. Only one power module 115 is illustrated in FIG. 1 as an example. The power rail 102 receives the electric power supply from the power module 115. The power module 115 may receive alternating current (AC) power from any suitable source, such as an electric grid or from power generation facilities at the worksite 100. Further, the power module 115 converts the AC power to DC power and supplies the DC power to the power rail 102.

The power rail 102 is supported by one or more poles 112. The power rail 102 may be constructed of a suitable conductor of electricity. The power rail 102 is embodied as rigid rails herein that extends alongside the route 108 at the worksite 106 and is supported by the poles 112. Further, the power rail 102 includes three or more rails that extend parallel to each other.

The system 100 includes a work machine 110 travelling on the route 108. Only a single work machine 110 is illustrated in FIG. 1 as an example. The work machine 110 may be a mining truck, a loader, a dozer, a dump truck, a skid loader, an excavator, a backhoe, a combine, a crane, a drilling equipment, a trencher, a tractor, or any other work machine. The work machine 110 is embodied as the mining truck herein. Specifically, the work machine 110 is an electric truck operating at the worksite 106. It should be noted that the work machine 110 may be assigned at the worksite 106 to perform work operations, such as moving payload from one place to another. The work machine 110 may be driven by an operator on the route 108.

In one example, the work machine 110 may include a diesel electric machine. Specifically, the work machine 110 may include a diesel engine (not shown) to provide operating power to the work machine 110 and the work machine 110 may also receive the electric power supply via an external power source, such as power supplied by the electric power supply system 104. In such instances, the work machine 110 may transition between being powered via the onboard diesel engine and the electric power supply system 104. In case of the diesel electric machine, power supplied by the electric power supply system 104 may be directly used to operate the work machine 110.

In another example, the work machine 110 may include a battery-operated work machine. Specifically, the work machine 110 may include a battery system (not shown) to provide operating power to the work machine 110. Further, in case of the battery-operated work machine, power supplied by the electric power supply system 104 may either be directly used to operate the work machine 110 or to charge the onboard battery system. The work machine 110 may also embody a hybrid work machine.

The work machine 110 includes an electric connector assembly 114 that connects with the power rail 102 to receive the electric power supply from the power rail 102. Specifically, the electric connector assembly 114 allows the work machine 110 to be electrically and/or physically connected to the power rail 102 and derive the electrical power supply therefrom. As the work machine 110 travels on the route 108, the electric connector assembly 114 receives the electric power supply from the power rail 102 of the electric power supply system 104.

The electric connector assembly 114 includes a boom 116. The boom 116 is coupled with a frame 111 of the work machine 110. The electric connector assembly 114 also includes a trailing arm 118 coupled with the boom 116 at one end 120 thereof. The electric connector assembly 114 further includes a contactor 122 coupled with the trailing arm 118 at an opposing end 124 thereof. The contactor 122 is in contact with the power rail 102. Thus, the trailing arm 118 extends between the boom 116 and the contactor 122.

Figure 2:
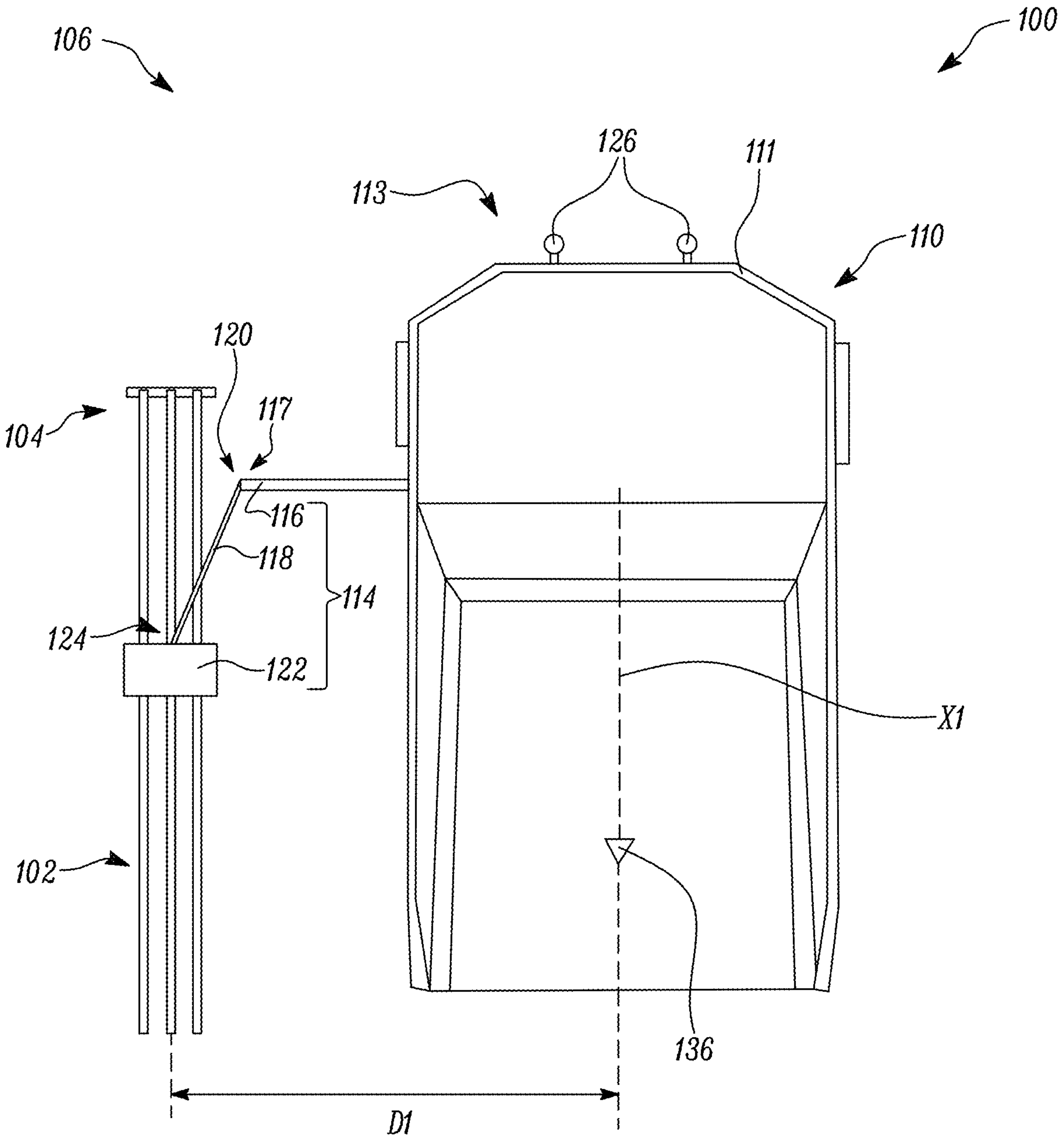
FIG. 2 is a schematic top view of the system of FIG. 1.

FIG. 2 is a schematic top view of the system 100 of FIG. 1. With reference to FIG. 2, the system 100 includes a first sensor 126 disposed on the work machine 110. The first sensor 126 generates a first input signal I1 (shown in FIG. 4) corresponding to a geographical position of the work machine 110 at the worksite 106, as the work machine 110 travels on the route 108. The first sensor 126 may include a global navigation satellite system antenna, a light detection and ranging (LIDAR) sensor, a radio detection and ranging (RADAR) sensor, and/or a camera. Alternatively, the first sensor 126 may include any other type of sensing device known to persons skilled in the art. In the illustrated example of FIG. 2, a pair of first sensors 126 are disposed at a front end 113 of the work machine 110. Alternatively, the work machine 110 may include any number of first sensors 126 based on application attributes. Further, the pair of first sensors 126 may be disposed at any location on the work machine 110. It should be noted that the first sensor 126 may determine a geographical position of a center 136 of a rear axle (not shown) of the work machine 110 at the worksite 106.

Figure 3:
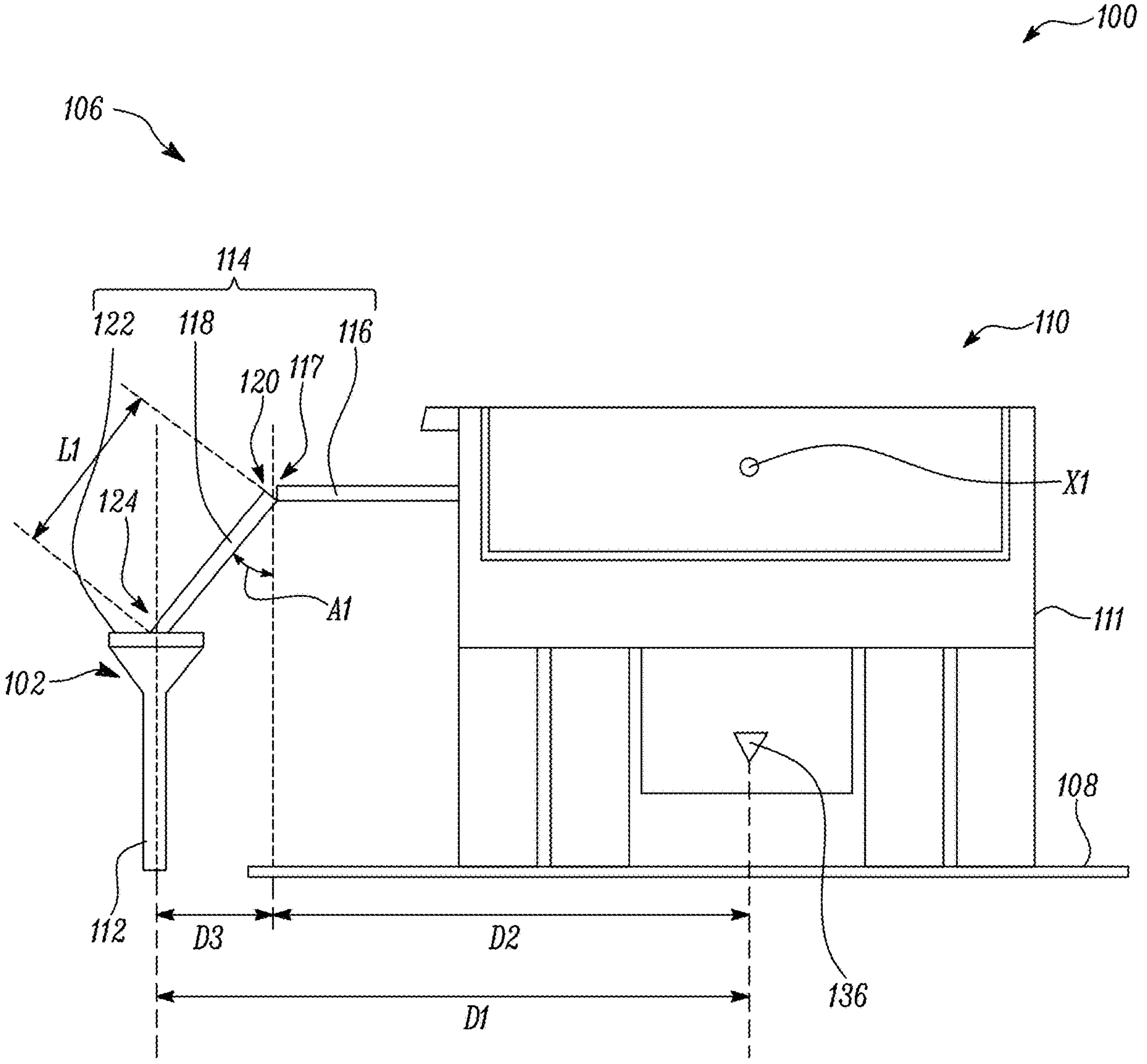
FIG. 3 is a rear schematic view of the system of FIG. 2.
Figure 4:
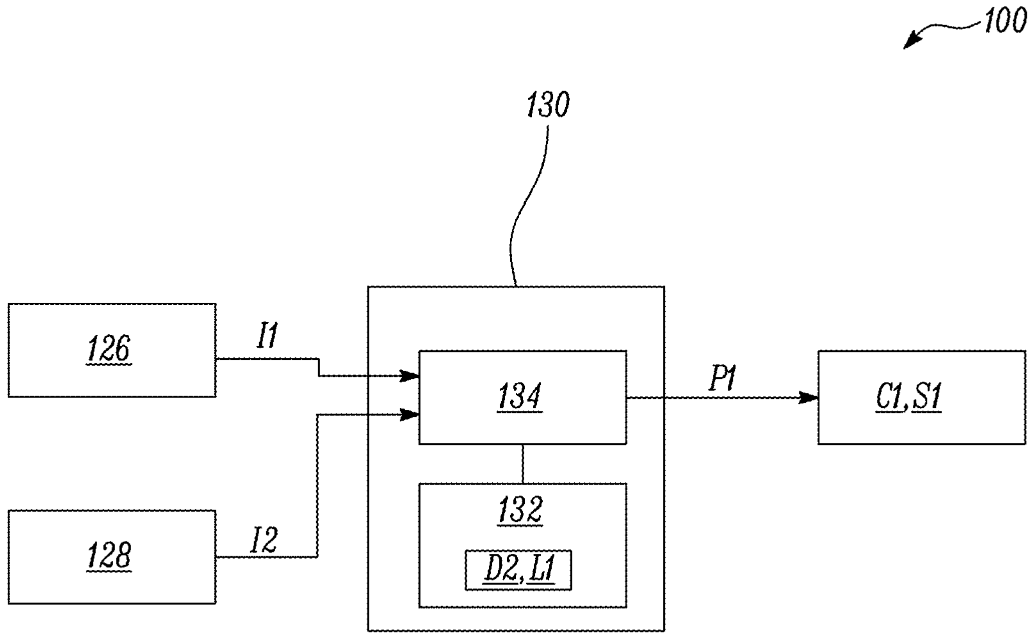
FIG. 4 is a schematic block diagram of the system of FIG. 1.

FIG. 3 is a rear schematic view of the system 100 of FIG. 2. FIG. 4 is a schematic block diagram of the system 100 of FIG. 1. With reference to FIGS. 2 to 4, the system 100 further includes a second sensor 128 disposed on the work machine 110. The second sensor 128 generates a second input signal I2 indicative of a distance D1 between the work machine 110 and the power rail 102, as the work machine 110 travels on the route 108. The distance D1 is defined between the contactor 122 and the center 136 of the rear axle. It should be noted that the second sensor 128 may include any type of sensor known to persons skilled in the art that provides information of the distance D1 between the work machine 110 and the power rail 102. Further, the system 100 may include a single second sensor 128 or multiple second sensors 128.

In one example, the second sensor 128 is the LIDAR sensor coupled with the work machine 110. The LIDAR sensor measures the distance D1 between the work machine 110 and the power rail 102. The LIDAR sensor may be coupled with the frame 111 of the work machine 110.

In another example, the second sensor 128 is the RADAR sensor coupled with the work machine 110. The RADAR sensor measures the distance D1 between the work machine 110 and the power rail 102. The RADAR sensor may be coupled with the frame 111 of the work machine 110.

In yet another example, the second sensor 128 is a camera coupled with the work machine 110. The camera measures the distance D1 between the work machine 110 and the power rail 102. The camera may be coupled with the frame 111 of the work machine 110.

In the illustrated example of FIGS. 2 to 4, the second sensor 128 is an angle sensor 128 that measures an angle A1 between the boom 116 and the trailing arm 118. The angle sensor 128 is coupled with the trailing arm 118. The second sensor 128 will be hereinafter interchangeably referred to as "the angle sensor 128". The angle sensor 128 may include any conventional sensor that measures angle between two components known to persons skilled in the art.

Referring to FIGS. 3 and 4, the system 100 further includes a controller 130. The controller 130 includes one or more memories 132. The one or more memories 132 of the controller 130 store a second distance value D2 corresponding to a distance D2 between the boom 116 and the center 136 of the work machine 110 therein. Specifically, the second distance value D2 is the distance D2 between an end 117 of the boom 116 at which the boom 116 is coupled with the trailing arm 118 and the center 136 of the rear axle. Specifically, the distance D2 is fixed for a particular work machine and is defined between a longitudinal axis X1 passing through the rear axle of the work machine 110 and the end 117 of the boom 116. The memories 132 also store a length value L1 corresponding to a length L1 of the trailing arm 118 therein. The length L1 is defined between the boom 116 and the contactor 122. It should be noted that, the distance D2 and the length L1 may vary based on a type or a model of the work machine 110 and/or a design of the electric connector assembly 114.

The one or more memories 132 may include any means of storing information, including a hard disk, an optical disk, a floppy disk, ROM (read only memory), RAM (random access memory), PROM (programmable ROM), EEPROM (electrically erasable PROM), or other computer-readable memory media.

The controller 130 also includes one or more processors 134 communicably coupled with each of the one or more memories 132, the first sensor 126, and the second sensor 128. It should be noted that the one or more processors 134 may embody a single microprocessor or multiple microprocessors for receiving various input signals and generating output signals. Numerous commercially available microprocessors may perform the functions of the processors 134. The one or more processors 134 may further include a general processor, a central processing unit, an application specific integrated circuit (ASIC), a digital signal processor, a field programmable gate array (FPGA), a digital circuit, an analog circuit, a microcontroller, any other type of processor, or any combination thereof. The one or more processors 134 may include one or more components that may be operable to execute computer executable instructions or computer code that may be stored and retrieved from the one or more memories 132.

The one or more processors 134 determine the geographical position of the work machine 110 at the worksite 106 based on the first input signal I1 received from the first sensor 126. In some cases, the one or more processors 134 may use a perception-based localization (PBL) technology to determine the geographical position of the work machine 110. The PBL technology may use landmarks with known locations at the worksite 106. Further, based on the first input signal I1 received from the first sensor 126 that may include the LIDAR sensor, the RADAR sensor, or the cameras, the one or more processors 134 may determine a distance of the work machine 110 from the landmarks to determine the geographical position of the work machine 110.

The one or more processors 134 also determine the distance D1 between the work machine 110 and the power rail 102 based on the second input signal I2 received from the second sensor 128. Further, the one or more processors 134 receive a number of first input signals I1 from the first sensor 126 at predefined time intervals and/or predefined distance intervals, as the work machine 110 travels on the route 108. Furthermore, the one or more processors 134 receive a number of second input signals I2 from the second sensor 128 at the predefined time intervals and/or the predefined distance intervals, as the work machine 110 travels on the route 108.

The one or more processors 134 further determine the position of the power rail 102 at the worksite 106 based on the geographical position of the work machine 110 at the worksite 106 and the distance D1 between the work machine 110 and the power rail 102.

A technique of determining the distance D1 between the work machine 110 and the power rail 102 as employed by the processors 134 will now be explained in detail. It should be noted that the technique disclosed herein is used when the second sensor 128 is the angle sensor 128. In order to determine the distance D1 between the work machine 110 and the power rail 102, the one or more processors 134 determine a first distance value D3 between the contactor 122 and the boom 116 based on the measurement of the angle A1 between the boom 116 and the trailing arm 118. The processors 134 use the angle A1 and the length value L1 of the trailing arm 118 to determine the first distance value D3 between the contactor 122 and the boom 116. Further, the one or more processors 134 retrieve the second distance value D2 from the one or more memories 132. The one or more processors 134 determine the distance D1 between the work machine 110 and the power rail 102 based on the determined first distance value D3 between the contactor 122 and the boom 116 and the second distance value D2.

The one or more processors 134 generate a number of position values P1 indicative of the position of the power rail 102 at the worksite 106 based on the number of first input signals I1 and the number of second input signals I2. Specifically, the number of position values P1 are generated based on the number of first and second input signals I1, I2 that are received from the first and second sensors 128, respectively. The first distance value D3 between the contactor 122 and the boom 116 varies as the work machine 110 travels along the route 108, based on an arrangement of the power rail 102 at the worksite 106. Thus, the distance D1 between the work machine 110 and the power rail 102 keeps varying along the route 108, due to which the number of position values P1 may have different values.

Further, in some examples, the one or more processors 134 generate a contour C1 of the power rail 102 based on a plotting of the number of position values P1. The contour C1 provides data corresponding to the arrangement of the power rail 102 at the worksite 106. The contour C1 may be processed further to create a virtual model of the power rail 102.

Furthermore, in some examples, the one or more processors 134 generate a site map S1 containing the position of the power rail 102 at the worksite 106. The site map S1 may contain, for example, positions of the power rail 102, the route 108, various building or offices at the worksite 106, holes or trenches at the worksite 106, and the like. The site map S1 may be used by autonomous work machines operating at the worksite 106 to perform work operations in an autonomous manner.

It should be noted that the controller 130 may communicate a position data of the power rail 102 as provided by the position values P1, the contour C1, and/or the site map S1 over a wireless network to a central server at the worksite 106. Further, work machines that are operating at the worksite 106 may wirelessly retrieve the position data from the central server.

It is to be understood that individual features shown or described for one embodiment may be combined with individual features shown or described for another embodiment. The above-described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure relates to the system 100 for determining the position of the power rail 102 of the electric power supply system 104 at the worksite 106. The system 100 includes the first sensor 126, the second sensor 128, and the controller 130 including the processors 134. The processors 134 determine the position of the power rail 102 precisely based on the first and second input signals I1, I2 received from each of the first sensor 126 and the second sensor 128, respectively. The system 100 may provide accurate and reliable data pertaining to the position of the power rail 102 and may eliminate a need for validation of the position of the power rail 102. Further, an implementation of the system 100 may allow a survey process of the power rail 102 to be performed only one time by the single work machine 110 at the worksite 106, rather than by every work machine at the worksite 106.

Furthermore, the system 100 may be cost-effective as it may eliminate a usage of additional surveying means, such as a light vehicle or a drone, to survey the position of the power rail 102 at the worksite 106. Thus, the system 100 may reduce a total cost of ownership for a deployment of autonomous work machines at the worksite 106 having the electric power supply system 104. Further, the work machine 110 that is used to generate the first and second input signals I1, I2 already operates at the worksite 106 to perform work operations, and thus may not incur any additional operational costs while the position of the power rail 102 is being determined. Furthermore, the system 100 may autonomously generate the contour C1 and/or the site map S1 containing the position of the power rail 102 at the worksite 106, thereby reducing human efforts and errors that are otherwise involved in determination of the position of the power rail 102 using manual surveying.

The system 100 described herein may be used to survey the position of the power rail 102 after first installation, or after a modification to a position of the power rail 102. Overall, the system 100 is simple in construction and may include fewer part numbers, may be cost-effective, may be time efficient, and may be used at existing worksites.

Figure 5:
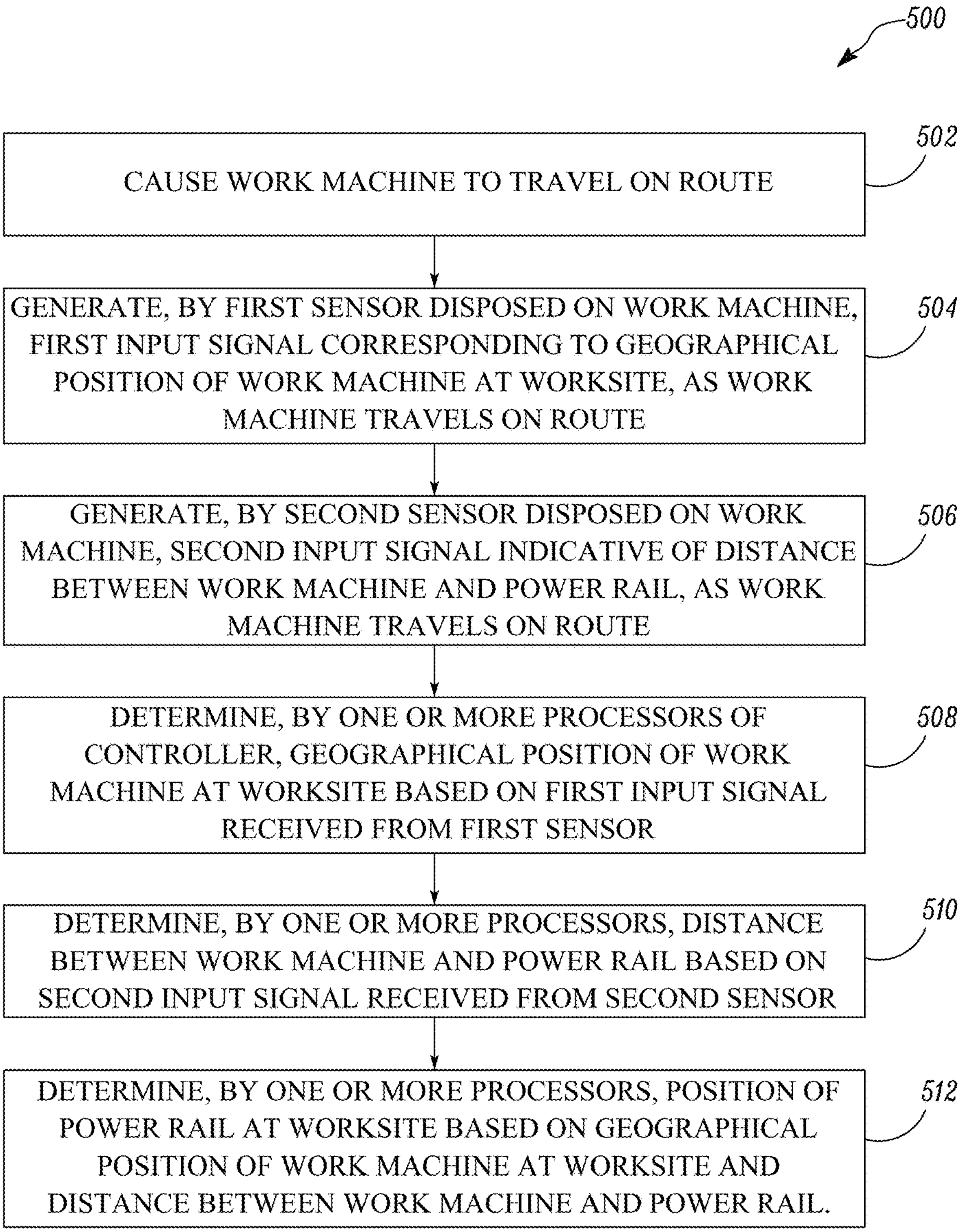
FIG. 5 is a flowchart for a method for determining the position of the power rail of the electric power supply system at the worksite, according to an example of the present disclosure.

FIG. 5 is a flowchart for a method 500 for determining the position of the power rail 102 of the electric power supply system 104 at the worksite 106. The power rail 102 extends alongside the route 108 at the worksite 106. With reference to FIGS. 1 to 5, at step 502, the work machine 110 is caused to travel on the route 108. The work machine 110 is the electric truck operating at the worksite 106.

At step 504, the first sensor 126 disposed on the work machine 110 generates the first input signal I1 corresponding to the geographical position of the work machine 110 at the worksite 106, as the work machine 110 travels on the route 108.

At step 506, the second sensor 128 disposed on the work machine 110 100 generates the second input signal I2 indicative of the distance D1 between the work machine 110 and the power rail 102, as the work machine 110 travels on the route 108.

At step 508, the one or more processors 134 of the controller 130 determine the geographical position of the work machine 110 at the worksite 106 based on the first input signal I1 received from the first sensor 126. The one or more processors 134 are communicably coupled with the first sensor 126.

At step 510, the one or more processors 134 determine the distance D1 between the work machine 110 and the power rail 102 based on the second input signal I2 received from the second sensor 128. The one or more processors 134 are communicably coupled with the second sensor 128.

At step 512, the one or more processors 134 determine the position of the power rail 102 at the worksite 106 based on the geographical position of the work machine 110 at the worksite 106 and the distance D1 between the work machine 110 and the power rail 102.

In an example, the work machine 110 includes the electric connector assembly 114 that connects with the power rail 102 to receive the electric power supply from the power rail 102. The electric connector assembly 114 includes the boom 116, the trailing arm 118 coupled with the boom 116 at one end 120 thereof, and the contactor 122 coupled with the trailing arm 118 at the opposing end 124 thereof. The contactor 122 is in contact with the power rail 102. In an example, the second sensor 128 is the angle sensor 128 that measures the angle A1 between the boom 116 and the trailing arm 118. The angle sensor 128 is coupled with the trailing arm 118. The step 510 also includes measuring, by the angle sensor 128, the angle A1 between the boom 116 and the trailing arm 118. The step 510 further includes determining, by the one or more processors 134, the first distance value D3 between the contactor 122 and the boom 116 based on the measurement of the angle A1 between the boom 116 and the trailing arm 118.

The method 500 further includes a step at which the second distance value D2 corresponding to the distance D2 between the boom 116 and the center 136 of the work machine 110 is stored within the one or more memories 132 of the controller 130. The one or more processors 134 are communicably coupled with the one or more memories 132. The step 510 further includes retrieving, by the controller 130, the second distance value D2 from the one or more memories 132. The step 510 further includes determining, by the controller 130, the distance D1 between the work machine 110 and the power rail 102 based on the first distance value D3 and the second distance value D2.

The method 500 further includes a step at which the one or more processors 134 receive the number of first input signals I1 from the first sensor 126 at the predefined time intervals and/or the predefined distance intervals, as the work machine 110 travels on the route 108. The method 500 further includes a step at which the one or more processors 134 receive the number of second input signals I2 from the second sensor 128 at the predefined time intervals and/or the predefined distance intervals, as the work machine 110 travels on the route 108. The method 500 further includes a step at which the one or more processors 134 generate the number of position values P1 indicative of the position of the power rail 102 at the worksite 106 based on the number of first input signals I1 and the number of second input signals I2.

The method 500 further includes a step at which the one or more processors 134 generate the contour C1 of the power rail 102 based on the plotting of the number of position values P1.

The method 500 further includes a step at which the one or more processors 134 generate the site map S1 containing the position of the power rail 102 at the worksite 106.

It should be noted that the steps 502, 504, 506, 508, 510, 512 of the method 500 may be performed in a sequence that is different from that explained in relation to FIG. 5. Further, various steps 502, 504, 506, 508, 510, 512 can be performed together.

While aspects of the present disclosure have been particularly shown and described with reference to the embodiments above, it will be understood by those skilled in the art that various additional embodiments may be contemplated by the modification of the disclosed work machine, systems and methods without departing from the spirit and scope of the disclosure. Such embodiments should be understood to fall within the scope of the present disclosure as determined based upon the claims and any equivalents thereof.

What is claimed is:

1. A system for determining a position of a power rail of an electric power supply system at a worksite, wherein the power rail extends alongside a route at the worksite, the system comprising:

a work machine for travelling on the route;

an electric connector assembly of the work machine configured to connect with the power rail to receive an electric power supply from the power rail;

a first sensor disposed on the work machine, wherein the first sensor is configured to generate a first input signal corresponding to a geographical position of the work machine at the worksite, as the work machine travels on the route;

a second sensor disposed on the work machine, wherein the second sensor is configured to detect a position of a first portion of the electric connector assembly relative to a second portion of the electric connector assembly, and wherein the second sensor is configured to generate a second input signal representative of the position of the first portion of the electric connector assembly relative to the second portion of the electric connector assembly, the second input signal indicative of a distance between the work machine and the power rail, as the work machine travels on the route; and a controller including one or more memories and one or more processors communicably coupled with each of the one or more memories, the first sensor, and the second sensor, wherein the one or more processors are configured to:

determine the geographical position of the work machine at the worksite based on the first input signal received from the first sensor;

determine the distance between the work machine and the power rail based on the second input signal received from the second sensor; and determine a position of the power rail at the worksite based on the geographical position of the work machine at the worksite and the distance between the work machine and the power rail.

2. The system of claim 1, wherein the first sensor is one or more of a global navigation satellite system antenna, a light detection and ranging (LIDAR) sensor, a radio detection and ranging (RADAR) sensor, and a camera.

3. The system of claim 1, wherein the electric connector assembly includes a boom, a trailing arm coupled with the boom at one end thereof, and a contactor coupled with the trailing arm at an opposing end thereof, wherein the first portion of the electric connector assembly includes the trailing arm, wherein the second portion of the electric connector assembly includes the boom, and wherein the contactor is in contact with the power rail, wherein the second sensor is an angle sensor that measures an angle between the boom and the trailing arm, and wherein the angle sensor is coupled with the trailing arm.

4. The system of claim 3, wherein the one or more processors are configured to determine a first distance value between the contactor and the boom based on the measurement of the angle between the boom and the trailing arm.

5. The system of claim 4, wherein the one or more memories of the controller are configured to store a second distance value corresponding to a distance between the boom and a center of the work machine.

6. The system of claim 5, wherein the one or more processors are configured to:

retrieve the second distance value from the one or more memories; and determine the distance between the work machine and the power rail based on the first distance value and the second distance value.

7. The system of claim 1, wherein the second sensor includes at least one of:

a LIDAR sensor coupled with the work machine, a RADAR sensor coupled with the work machine, and a camera coupled with the work machine.

8. The system of claim 1, wherein the one or more processors are configured to:

receive a plurality of first input signals from the first sensor at predefined time intervals and/or predefined distance intervals, as the work machine travels on the route;

receive a plurality of second input signals from the second sensor at the predefined time intervals and/or the predefined distance intervals, as the work machine travels on the route; and generate a plurality of position values indicative of the position of the power rail at the worksite based on the plurality of first input signals and the plurality of second input signals.

9. The system of claim 8, wherein the one or more processors are configured to generate a contour of the power rail based on a plotting of the plurality of position values.

10. The system of claim 1, wherein the one or more processors are configured to generate a site map containing the position of the power rail at the worksite.

11. The system of claim 1, wherein the work machine is an electric truck operating at the worksite.

12. A method for determining a position of a power rail of an electric power supply system at a worksite, wherein the power rail extends alongside a route at the worksite, the method comprising:

causing a work machine to travel on the route;

generating, by a first sensor disposed on the work machine, a first input signal corresponding to a geographical position of the work machine at the worksite, as the work machine travels on the route;

detecting, by a second sensor disposed on the work machine, a position of a first portion of an electric connector assembly of the work machine relative to a second portion of the electric connector assembly, the electric connector assembly configured to connect with the power rail to receive an electric power supply from the power rail;

generating, by the second sensor, a second input signal representative of the position of the first portion of the electric connector assembly relative to the second portion of the electric connector assembly, the second input signal indicative of a distance between the work machine and the power rail, as the work machine travels on the route;

determining, by one or more processors of a controller, the geographical position of the work machine at the worksite based on the first input signal received from the first sensor, wherein the one or more processors are communicably coupled with the first sensor;

determining, by the one or more processors, the distance between the work machine and the power rail based on the second input signal received from the second sensor, wherein the one or more processors are communicably coupled with the second sensor; and determining, by the one or more processors, a position of the power rail at the worksite based on the geographical position of the work machine at the worksite and the distance between the work machine and the power rail.

13. The method of claim 12, wherein the electric connector assembly includes a boom, a trailing arm coupled with the boom at one end thereof, and a contactor coupled with the trailing arm at an opposing end thereof, wherein the first portion of the electric connector assembly includes the trailing arm, wherein the second portion of the electric connector assembly includes the boom, wherein the contactor is in contact with the power rail, wherein the second sensor is an angle sensor that measures an angle between the boom and the trailing arm, wherein the angle sensor is coupled with the trailing arm, and wherein the step of determining, by the one or more processors, the distance between the work machine and the power rail further includes:

measuring, by the angle sensor, the angle between the boom and the trailing arm.

14. The method of claim 13, wherein the step of determining, by the one or more processors, the distance between the work machine and the power rail further includes:

determining, by the one or more processors, a first distance value between the contactor and the boom based on the measurement of the angle between the boom and the trailing arm.

15. The method of claim 14 further comprising storing, within one or more memories of the controller, a second distance value corresponding to a distance between the boom and a center of the work machine, wherein the one or more processors are communicably coupled with the one or more memories.

16. The method of claim 15, wherein the step of determining, by the one or more processors, the distance between the work machine and the power rail further includes:

retrieving, by the controller, the second distance value from the one or more memories; and determining, by the controller, the distance between the work machine and the power rail based on the first distance value and the second distance value.

17. The method of claim 12 further comprising:

receiving, by the one or more processors, a plurality of first input signals from the first sensor at predefined time intervals and/or predefined distance intervals, as the work machine travels on the route;

receiving, by the one or more processors, a plurality of second input signals from the second sensor at the predefined time intervals and/or the predefined distance intervals, as the work machine travels on the route; and generating, by the one or more processors, a plurality of position values indicative of the position of the power rail at the worksite based on the plurality of first input signals and the plurality of second input signals.

18. The method of claim 17 further comprising generating, by the one or more processors, a contour of the power rail based on a plotting of the plurality of position values.

19. The method of claim 12 further comprising generating, by the one or more processors, a site map containing the position of the power rail at the worksite.

20. The method of claim 12, wherein the work machine is an electric truck operating at the worksite.

* * * * *